Jan. 29, 1957 P. J. RIEPPEL ET AL 2,779,086
METHOD OF MAKING A HOLLOW METAL STRUCTURE
Filed Dec. 9, 1954 2 Sheets-Sheet 1

INVENTOR.
Perry J. Rieppel
Melvin C. Clapp
BY Robert M. Evans

Gray, Mase & Dunson
ATTORNEYS

Jan. 29, 1957  P. J. RIEPPEL ET AL  2,779,086
METHOD OF MAKING A HOLLOW METAL STRUCTURE
Filed Dec. 9, 1954  2 Sheets-Sheet 2

INVENTOR.
Perry J. Rieppel
BY Melvin C. Clapp
Robert M. Evans

Gray, Mase & Dunson
ATTORNEYS.

United States Patent Office 2,779,086
Patented Jan. 29, 1957

2,779,086

METHOD OF MAKING A HOLLOW METAL STRUCTURE

Perry J. Rieppel, Worthington, and Melvin C. Clapp and Robert M. Evans, Columbus, Ohio, assignors, by mesne assignments, to The Metal Specialty Company, Cincinnati, Ohio, a corporation of Ohio Application December 9, 1954, Serial No. 474,228

4 Claims. (Cl. 29—157.3)

This invention relates to hollow metal structures and their method of manufacture. More particularly, it relates to an improved method of manufacturing such structures by the application between the outer sheets or layers of a metal sheet composite or laminate of an internal forming pressure tending to form these outer sheets or layers to the internal configuration of restricting dies.

When metal sheets are heated to the range of temperature wherein they attain a greater ductility, it is possible, by the injection of a forming medium such as a gas or other fluid under pressure between the metal sheets, to readily force the metal of the sheets to assume the internal shape of restricting dies. In some instances, it is not necessary to heat the sheets. It is thus possible to form continuous tubing, chambers, or other shapes between such metal sheets.

The method of the present invention may be practiced upon metal composites in which an intermediate or inner metal of the composite has the properties of a lower melting point than the melting points of the covering or outer metals and a capability to bond under heat with the covering or outer metals. Thus, by heating the composite to approximately the melting point of the intermediate metal, two purposes are served. First, the softened or fluid condition of the intermediate metal allows the introduction therein of a forming medium capable of forming the covering metals by internal fluid pressure in regions where the shape of the restricting dies permits such formation. Second, in regions where such pressure forming of the outer metals is not permitted by the internal configuration of the dies, the intermediate metal either forms an alloy bond between the outer metals, or strengthens such a bond if the bond is made prior to the heating.

For example, a metal composite of the type described above may be inserted between restricting members such as dies. Then a relatively light holding pressure may be applied between the restricting members in order to restrain the internal-fluid pressure which is to be applied and to prevent the escape of such internal pressure from the container formed by such pressure between the restricting members. The composite may then be heated, as by heated dies, to approximately the melting point of the intermediate metal or higher, but always enough lower than the melting points of the outer metals that the outer metals do not become too soft or tend to stick to the dies. Thus, the intermediate metal is softened or made fluid. While maintaining the composite at a temperature of at least approximately the melting point of the intermediate metal, upon the introduction of a forming medium, as by the insertion of a nipple leading from a tank of gas under pressure into a region of the intermediate metal, the application of a sufficient forming pressure forms the outer metals to the internal configuration of the restricting members. After this formation, the forming pressure may be released, the resulting structure removed from the restricting members, and the structure allowed to cool. In regions in which the intermediate metal has not been forced apart by the forming action, the intermediate metal forms an alloy bond between the outer metals.

It is an object of this invention to provide a method for manufacturing hollow metal structures that is simple throughout and can be performed at a relatively low cost.

The present invention has as another object the provision of a process of pressure forming metal sheet structures by internal fluid pressure in which pressure welding is unnecessary.

A further object is the provision of a method of manufacturing heat exchangers and the like by the application of an internal fluid pressure tending to spread apart a multilayer sheet and to form the outer layer of the sheet to the internal configuration of restricting dies, in which the initial multilayer sheet is simple in structure and easy to obtain.

Another object of this invention is to provide an improved refrigerator evaporator which is simple of construction and manufacture.

Other objects of the present invention will be apparent from the detailed description herein.

Figure 1:
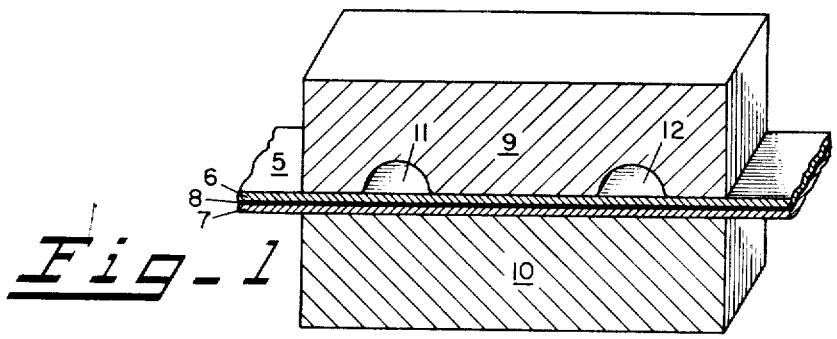
Fig. 1 is a cross-sectional view of a metal sheet composite inserted in dies prior to the application of an internal forming pressure in accordance with the present invention.

Many of the problems connected with oxidation, or the forming of other impurities, on the surfaces of the metal sheets used in the process of the present invention can be overcome by prerolling a laminated metal structure to be used as a single sheet during the forming process. Typical of one method of providing a rolled sheet with the proper characteristics is to join in the rolling operation two equal thickness of aluminum with an intermediate thickness of zinc. Prior to rolling, the outer aluminum sheets should be degreased and wire-brushed. The central sheet of zinc should be etched before it is degreased and wire-brushed.

This composite, after being assembled, is rolled so that a bond is formed at the aluminum-zinc interfaces. The temperature at which the sheets are rolled determines, to a large extent, the nature of the bond effected at the aluminum-zinc interfaces. Rolling two sheets of aluminum, each 0.125-inch thick, about a sheet of zinc 0.025-inch thick, the rolling being done at a temperature of about 700° F., consistently provides an alloy bond at the interface joints. Even if the rolling temperature is very much lower than 700° F., some alloying may take place at the interfaces, although the bond effected is mostly mechanical. Of course, even during a cold-rolling process, some thin alloy is formed at the interfaces by diffusion of the metals. The zinc interlayer may be quite thin. Laminates yielding good results during the forming operation have been made by rolling aluminum sheets each 0.250-inch thick with an inner zinc sheet 0.005-inch thick at room temperature, about 70° F. A rolled metal sheet of the type described may be used directly in the pressure-forming operation. A rolled sheet with a final total thickness of 0.060 inch provides good results.

Heating of the metal sheet composite to a temperature of at least approximately the melting point of the intermediate metal may be accomplished before the composite is placed in the dies, or it may be accomplished while the metal is in the dies to be used in the pressure-forming operation. Heated dies may be used for this latter purpose. If the heating of the metal is done by the dies, the metal should be held in the dies for a short time prior to the introduction of fluid pressure into the composite. The dies may be heated electrically, by hot salts, by gas, or by any other convenient method that maintains the necessary temperature. For a segment of an aluminum-zinc-aluminum rolled metal sheet placed in dies heated to approximately 850° F., a 0.060-inch thick sheet reaches a temperature of approximately 800° F. in much less time than it takes to close the dies and make an entry between the aluminum sheets of a tool or nipple from a source of fluid pressure.

Unless the dies or the outer surfaces of the sheet to be formed are treated prior to the insertion of the sheet between the dies with a material to prevent sticking, the sheet tends to stick to the dies. Various graphite compounds (such as those known as Oildag and Aquadag) may be used to prevent sticking. Various chalk or talc compounds may also be used. Such compounds may be applied either to the dies or to the surfaces of the metal sheet coming into contact with the dies. In commercial processes, it is preferable to apply the antisticking compound to the metal sheet composite or laminate in order to secure optimum use of time during the operation with the dies.

Although a number of different methods may be used for introducing the forming pressure between the outer metal sheets, a preferred method is to introduce a gas under pressure through a hollow tube inserted between the sheets. The tube or tool through which the gas pressure is to pass may be forced into the molten inner layer between the outer sheets so that the outlet of the gas pressure at the leading edge of the tool is in a region where expansion of the outer metal sheets is permitted by the internal configuration of the dies in that region. Good results have been obtained using a spade-type or needle-type tool. The main body of the tool is cylindrical in structure. The shape of the dies, when using this method of introducing the pressure, should be such that the dies allow the spreading of the outer sheets only enough so that the entry of the tool can be made. When the tool is tightly forced into place, it is fluidtight. The tool or nipple thus extends from the edges of the sheets and communicates with the region in which the spaces between the sheets are to be formed. If the areas to be formed are not continuous, a separate tool or needle is needed for each separate area. After the pressure forming has been completed, the tool may be withdrawn from the sheets.

For an aluminum-zinc-aluminum composite, a forming gas pressure of from 300 to 700 p. s. i. is applied to the interior of the aluminum sheets through the tool or nipple, thus spreading the aluminum sheets to form them to the internal configuration of the dies. A typical gas that may be used successfully is nitrogen. The internal gas pressure does not force the dies apart, nor does the gas escape from the dies through the zinc interlayer, because of the holding pressure applied to the dies during the forming process. A typical holding pressure is approximately 1500 p. s. i.

The forming pressure may be released and the tool removed, but the resulting structure should be handled very carefully while it is still hot, since it is very weak and susceptible to bending or misforming.

Perhaps the most common source of failure of any structure that is pressure formed from a zinc-bonded aluminum sheet is the stress corrosion caused by the action of the hot zinc. When an aluminum-zinc-aluminum laminate is heated to about 800° F., a zinc-aluminum alloy has already begun to form at the interfaces of the zinc and aluminum. When the internal gas pressure is applied and the internal configurations are formed, the aluminum sheet is stretched to match the internal configuration of the dies. The stretching of the aluminum exposes a fresh aluminum surface to the action of the hot zinc, and further formation of zinc-aluminum alloy occurs immediately. Since most of the stretching of the aluminum occurs at the edges of the convolutions formed, the points most vulnerable to stress corrosion are in these regions. Thus, much of the success of the present method depends upon the shortness of the time during which heating of the sheet and the forming operation may take place, so that failure by stress corrosion does not occur. For the types of aluminum-zinc-aluminum laminates mentioned, very little danger from stress corrosion is present if the structure is not kept hot for more than half a minute. If the piece is kept at too high a temperature for very much more than one or two minutes, however, dangerous stress corrosion is likely to be present. Thus, it is preferred that the forming operation take place shortly after the composite or laminate has been brought to a temperature of at least approximately the melting point of the intermediate metal, and that the resulting structure, after forming, be immediately allowed to cool.

Permanent tubes may be placed within the cavities left by the withdrawal of the nipples or tools from the sources of gas pressure by brazing such tubes to the outer sheets, using a filler material where necessary. In an aluminum-zinc-aluminum structure, if a tube of aluminum is clean, the zinc remaining at the entry and exit holes at the parting line of the sheet bonds the tube to the sheets under heat.

In an aluminum-zinc-aluminum structure, some of the intermediate layer of the zinc is extruded out during the forming operation, the amount extruded depending upon the initial thickness of the zinc layer and the holding pressure. In using a laminate in which a zinc sheet initially 0.025-inch thick is laminated to aluminum sheets each 0.125-inch thick and in which rolling reduces the total thickness of the laminate to 0.060 inch, about 75 percent of the zinc is extruded out during the forming operation. On the other hand, in using laminates which utilize intermediate sheets of zinc of a thickness prior to rolling of 0.005 inch, rolled to a total laminate thickness of 0.060 inch, very little zinc is extruded.

Figure 2:
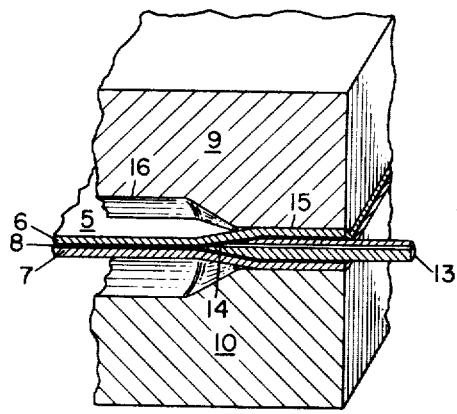
Fig. 2 is a cross-sectional view of a metal composite sheet between dies, illustrating one method of introducing gas or fluid pressure between the sheets.

Fig. 1 shows a metal sheet composite or laminate 5, typically comprising aluminum outer layers 6 and 7 and a zinc inner layer 8 held between outer restricting dies 9 and 10, at least one of these dies containing convolutions or other internal configurations such as those illustrated at 11 and 12. With reference to Fig. 2, after the sheet composite or laminate 5 has been heated to about the melting point of its inner layer 8, a nipple or tool 13 from a source of gas pressure may be introduced into the softened or fluid inner layer 8. The dies are constructed at 15 so that a tool 13 with a cylindrical body can be forced in between the outer sheets 6 and 7 far enough so that the fluid outlet 14 is in a region where the internal configuration of the dies permits expansion of the outer sheets, as at 16. Shown is a spade-type tool 13 which is introduced far enough into the inner layer 8 of the sheet composite or laminate 5 so that the fluid outlet 14 near the leading edge of the tool is in a region where the internal configuration 16 of the dies will permit expansion of the outer sheets by the internal forming pressure.

Figure 3:
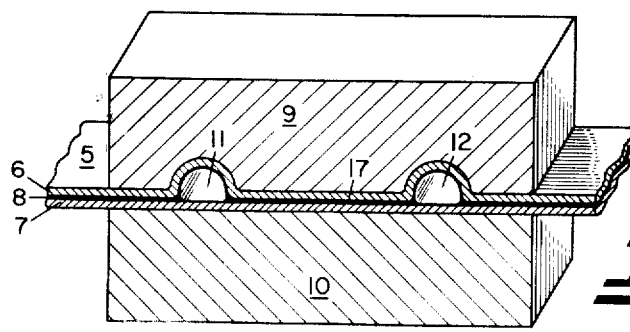
Fig. 3 is a cross-sectional view of a metal sheet composite in dies after the outer sheets thereof have been formed to the internal configuration of the dies.

When, shortly after the composite reaches the appropriate temperature, the forming pressure is introduced into the inner layer 8 through the tool 13, the outer sheets 6 and 7 are formed, as illustrated by Fig. 3, to the internal configuration of the restricting dies 9 and 10. During the forming operation, which takes place at approximately 800° F. for a zinc-bonded aluminum sheet composite, the inner layer 8 is broken in regions 11 and 12 where the restricting dies 9 and 10 allow the expansion of the outer layer 6; but an alloy between the metal of the inner layer and the metals of the outer layers is formed in all other regions, such as 17 firmly bonding the outer sheets 6 and 7.

Figure 4:
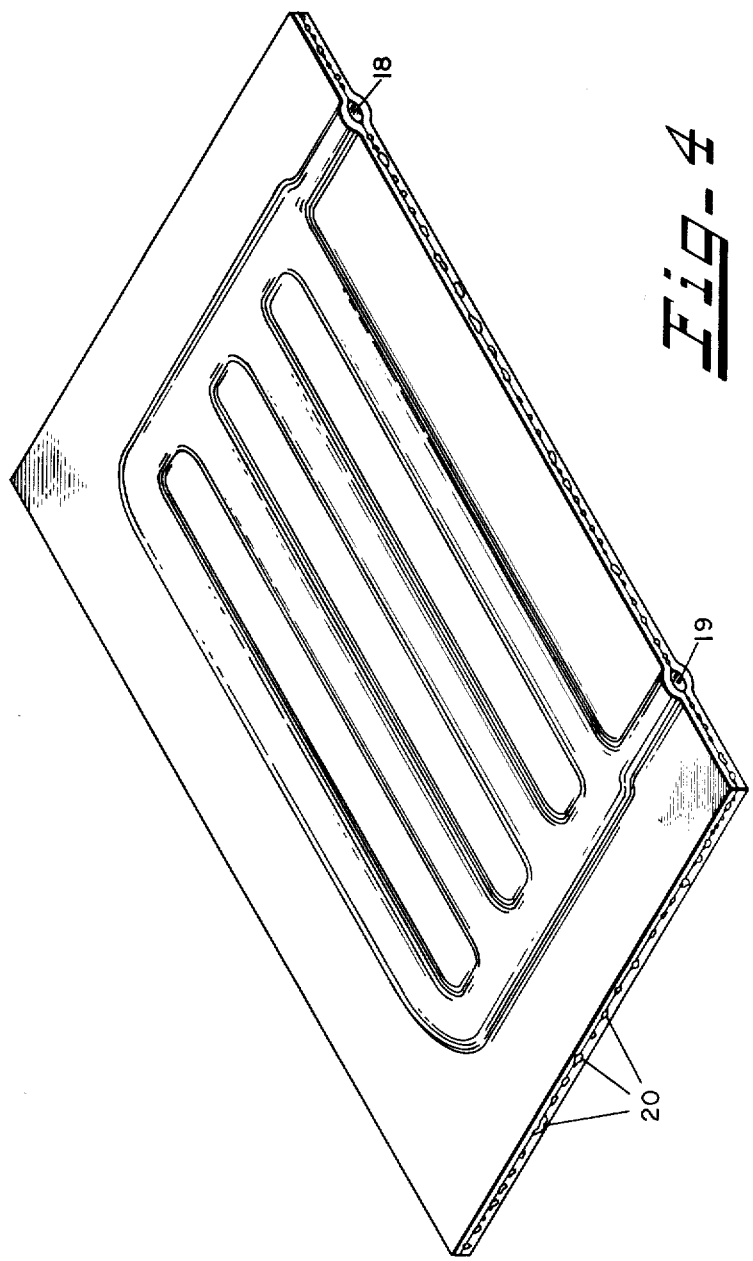
Fig. 4 is a pictorial view of an article produced by the process of the present invention.

Fig. 4 shows one type of hollow metal structure, a refrigerator evaporator, which can be easily manufactured according to the present invention. The structure is shown just as it appears immediately after being released from the forming dies. Tool entries have been made at 18 and 19, at least one of the tools providing the internal outlet from a source of forming pressure, such as nitrogen gas under pressure. If only one of the tool entries is used to provide the pressure outlet, the other tool may be used as a plug. For the structure shown in Fig. 4, the tools have been removed, leaving the entry tubes at 18 and 19 to which entry and exit tubing for refrigerant passage may be brazed or otherwise affixed. Shown along the outer perimeter of the evaporator are beads of zinc 20 extruded from the excess zinc between the hot aluminum sheets under the action of the holding pressure of the dies. The structure shown in Fig. 4 may be trimmed, anodized, and shaped, if necessary, in order to provide a finished evaporator structure.

In metal sheet composites having aluminum outer sheets, alloys and metals other than zinc may be used as the intermediate material. For example, magnesium-aluminum alloys which melt at approximately 850° F. may be so used.

It is apparent that many fluids may be used as forming media. But, since there exists a danger of forming unwanted compounds between the fluid used for the internal pressure forming and the intermediate material of the metal composite, a fluid that will not form such unwanted compounds should be used. If the convolutions or internal configurations of the restricting dies are large enough, it may be necessary to use a heated fluid rather than one at room temperature so that the metal material will not be unduly cooled.

Also, small passages should preferably be placed in the dies to allow communication between the convolutions or other internal configurations of the dies and the atmosphere. This prevents entrapment of air in these convolutions as the forming takes place and thereby prevents collapsing of the formed structure when the internal forming pressure is removed.

It will be understood, of course, that while the forms of the invention herein shown and described constitute the typical or preferred embodiments of the invention, it is not intended herein to illustrate all of the possible equivalent forms or ramifications of this invention. It will also be understood that the words used are words of description rather than of limitation and that various changes, such as changes in shape, relative size, and arrangement of parts, may be substituted without departing from the spirit or scope of the invention herein disclosed.

What is claimed is:

1. A method of manufacturing a heat exchanger or the like which comprises the steps of: inserting an aluminum-zinc-aluminum laminate between heated dies at a holding pressure of at least about 1500 p. s. i.; heating said laminate by said heated dies to at least approximately the melting point of zink, but below the melting point of aluminum; shortly thereafter, introducing a nipple from a source of gas pressure into the intermediate zinc layer in such manner that the nipple outlet is in a region of said laminate in which the configuration of said dies permits expansion of the aluminum outer layers and applying from about 300 p. s. i. to about 700 p. s. i. fluid pressure from said source while said laminate is maintained at a temperature of at least approximately the melting point of zinc to form said aluminum outer layers to the internal configuration of said dies; and releasing said fluid pressure, removing the resulting structure from said dies, and immediately allowing said resulting structure to cool, whereby said aluminum outer layers are bonded together by said intermediate zinc layer in regions of said laminate in which the configuration of said dies does not permit expansion of said aluminum outer layers.

2. In a method of manufacturing a hollow metal structure, the steps of: inserting in tight relationship between dies a metal laminate containing an intermediate layer having a lower melting point than the melting point of the outer layers and a capability to bond said outer layers together under heat; heating said laminate to at least approximately the melting point of said intermediate layer but below the melting point of said outer layers; shortly thereafter, introducing a source of fluid pressure into said intermediate layer in such manner as to place said source in a region of said laminate in which the configuration of said dies permits expansion of said outer layers and applying sufficient fluid pressure through said source into said intermediate layer, while said laminate is maintained at a temperature of at least approximately the melting point of said intermediate layer, to expand said outer layers by internal fluid pressure where the configuration of said dies permits such expansion; and releasing said fluid pressure, removing the resulting structure from the dies, and immediately allowing said structure to cool, whereby said outer layers are bonded with said intermediate layer in regions of said laminate in which the configuration of said dies does not permit expansion of said outer layers.

3. A method of manufacturing a hollow metal structure which comprises the steps of: inserting in tight relationship between dies a multilayer metal laminate having outer layers composed primarily of aluminum and at least one inner layer composed of a material having a substantially lower melting point than the melting point of said outer layers and a capability of bonding under heat with said outer layers; heating said laminate to at least approximately the melting point of said inner layer but below the melting point of said outer layers; shortly thereafter, introducing, while said laminate is maintained at a temperature of at least approximately the melting point of said inner layer, into said inner layer in a region of said laminate in which the configuration of said dies permits expansion of said outer layers sufficient fluid pressure to expand said outer layers by internal forming pressure where the configuration of said dies permits such expansion; and immediately allowing the resulting structure to cool, whereby said outer layers are bonded together in regions of said laminate in which the configuration of said dies does not permit expansion of said outer layers.

4. A method of manufacturing a hollow metal structure which comprises the steps of: inserting in tight relationship between dies a metal composite containing an intermediate portion having a substantially lower melting point than the melting point of the outer portions of said composite and having a capability to bond under heat with said outer portions; heating said composite to at least approximately the melting point of said intermediate portion, but below the melting point of said outer portions; shortly thereafter, introducing into said intermediate portion in a region of said composite in which the configuration of said dies permits expansion of said outer portions sufficient fluid pressure to expand said outer portions, by internal fluid pressure, where the configuration of said dies permits such expansion; and immediately allowing the resulting structure to cool, whereby said outer portions are bonded to said inner portion in regions of said composite in which the configuration of said dies does not permit expansion of said outer portions.

References Cited in the file of this patent

UNITED STATES PATENTS

| | | |
|---|---|---|
| 2,232,176 | Guthrie | Feb. 18, 1941 |
| 2,582,358 | Schoellerman | Jan. 15, 1952 |
| 2,690,002 | Long | Sept. 28, 1954 |

UNITED STATES PATENT OFFICE
Certificate

Patent No. 2,779,086 — Patented January 29, 1957

Perry J. Rieppel, Melvin C. Clapp
and
Robert M. Evans

Application having been made jointly by Perry J. Rieppel, Melvin C. Clapp and Robert M. Evans, the inventors named in the patent above identified, and The Metal Specialty Company, a corporation of Ohio, the assignee, for the issuance of a certificate under the provisions of Title 35, Section 256 of the United States Code, deleting the name of the said Robert M. Evans from the patent as a joint inventor, and a showing and proof of facts satisfying the requirements of the said section having been submitted, it is this 9th day of May 1961, certified that the name of the said Robert M. Evans is hereby deleted from the said patent as a joint inventor with the said Perry J. Rieppel and Melvin C. Clapp.

[SEAL]

ARTHUR W. CROCKER,
*First Assistant Commissioner of Patents.*

Disclaimer 2,779,086.—*Perry J. Rieppel*, Worthington, *Melvin C. Clapp*, and *Robert M. Evans*, Columbus, Ohio. METHOD OF MAKING A HOLLOW METAL STRUCTURE. Patent dated Jan. 29, 1957. Disclaimer filed Feb. 28, 1961, by the assignee, *The Metal Specialty Company*.
Hereby enters this disclaimer to claims 2, 3, and 4 of said patent.
[*Official Gazette May 30, 1961.*]